United States Patent [19]
Bernadic et al.

[11] Patent Number: 5,549,424
[45] Date of Patent: Aug. 27, 1996

[54] INDEXABLE THREADING AND TURNING INSERT WITH PRESSED-IN CHIP BREAKERS

[75] Inventors: Thomas Bernadic, Madison Heights; Steven F. Wayne, Rochester Hills, both of Mich.

[73] Assignee: Valenite Inc., Madison Heights, Mich.

[21] Appl. No.: 344,914

[22] Filed: Nov. 25, 1994

[51] Int. Cl.⁶ .................................................. B23B 27/06
[52] U.S. Cl. ................................ 407/100; 407/114
[58] Field of Search ........................... 407/99, 100, 113, 407/114, 24

[56] References Cited

U.S. PATENT DOCUMENTS

| | | | |
|---|---|---|---|
| 4,011,049 | 3/1977 | McCreery | 407/113 |
| 4,131,383 | 12/1978 | Powers | 407/114 |
| 4,787,784 | 11/1988 | Bernadic et al. | |
| 4,846,609 | 7/1989 | Bernadic et al. | 407/114 |
| 4,854,785 | 8/1989 | Lowe et al. | 407/115 |
| 5,147,159 | 9/1992 | Lowe et al. | 407/114 |
| 5,192,171 | 3/1993 | Ther et al. | 407/114 |
| 5,193,947 | 3/1993 | Bernadic et al. | 407/114 |
| 5,203,649 | 4/1993 | Katbi et al. | 407/114 |
| 5,207,748 | 5/1993 | Katbi et al. | 407/114 |
| 5,230,591 | 7/1993 | Katbi et al. | 407/114 |
| 5,249,894 | 10/1993 | Bernadic et al. | 407/114 |
| 5,265,985 | 11/1993 | Boppana et al. | 407/114 |

FOREIGN PATENT DOCUMENTS

84/02671  7/1984  WIPO ................................ 407/114

*Primary Examiner*—M. Rachuba
*Assistant Examiner*—Kenneth J. Hansen
*Attorney, Agent, or Firm*—Mary K. Cameron

[57] ABSTRACT

An indexable threading and turning insert with integral press-in chip breakers, having a threading insert portion and a turning insert portion. Each of the threading insert portion and the turning insert portion has, respectively, an integral pressed-in chip breaker having ideal chip management characteristics. The indexable threading and turning insert has a substantially diamond shape having a first planar face, an opposite second planar face, and four insert faces extending between the first and second planar faces. The threading insert portion is characterized by a first cutting edge formed at the intersection of the first insert face and a first land and a second cutting edge formed at the intersection of the second insert face and a second land. The first and second cutting edges have a plurality of noses separated by gullets. First and second integral, pressed-in chip breakers, each in the form of a raised island, the incident face contour thereof corresponding to the nose-and-gullet contour of the respective cutting edge adjacent thereto. The turning insert portion is characterized by third and fourth cutting edges located, respectively, at the intersection of a third land with the third and fourth insert faces, and at the intersection of a fourth land with the third and fourth insert faces. Third and fourth integral, pressed-in chip breakers, each in the form of a raised island corresponding to the contour of the respective cutting edge adjacent thereto.

22 Claims, 3 Drawing Sheets

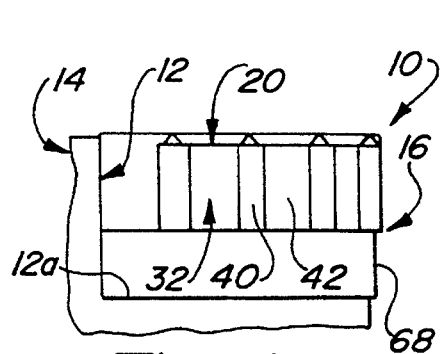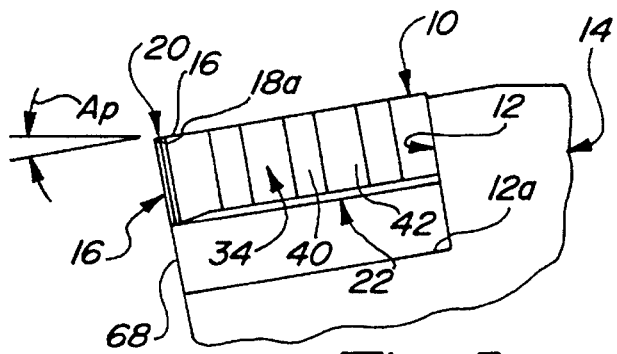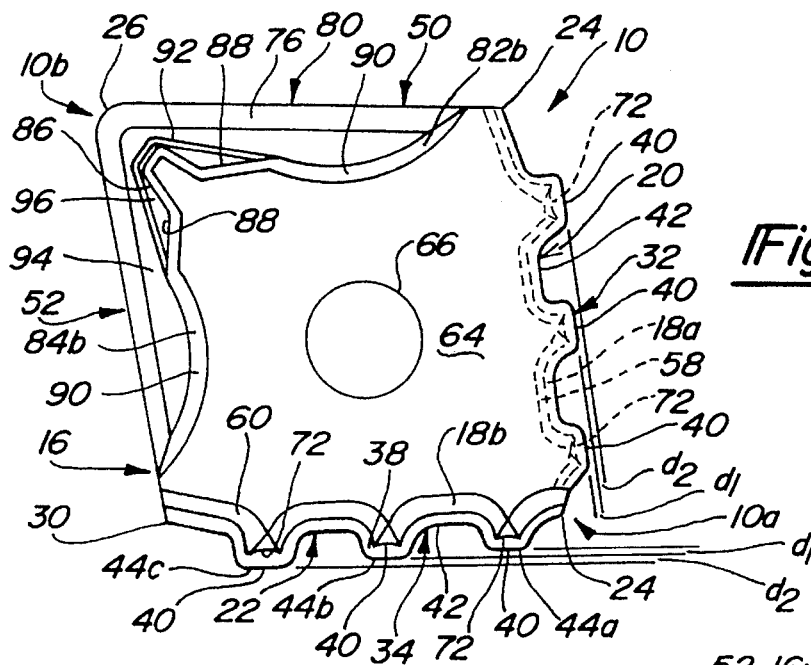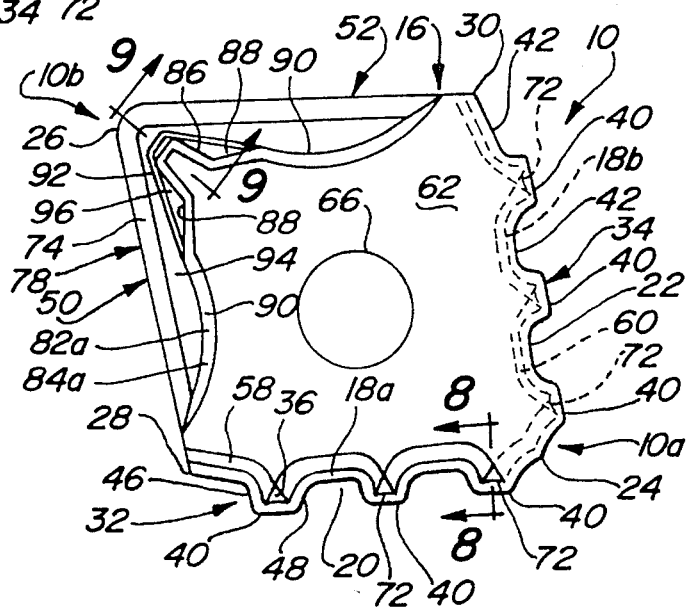

INDEXABLE THREADING AND TURNING INSERT WITH PRESSED-IN CHIP BREAKERS

BACKGROUND OF THE INVENTION

1. Field of the Invention

The present invention relates to indexable inserts. More particularly, the present invention relates to apparatus for providing thread forms on a workpiece and apparatus for turning a workpiece. Still more particularly, the present invention relates to a threading and turning insert which is indexable and integrally incorporates a pressed-in chip breaker, respectively, for each of the threading and turning insert portions thereof.

2. Description of the Related Art

Threading of a workpiece is conventionally performed using a positive, precision ground flat-face threading insert. The conventional threading insert is presented in a neutral position to the centerline of the workpiece, which requires that the conventional threading insert have a positive clearance angle. This positive geometry limits the number of cutting edges to just one. The conventional threading insert is used in conjunction with an adjoining, separate, inclined surface mechanical chip breaker. The conventional threading insert and mechanical chip breaker are seated in a pocket of a toolholder for providing selected engagement with respect to a workpiece to thereby provide it with threads.

While the conventional threading insert performs its thread cutting function adequately, there yet remains the problem that when the conventional threading insert cutting edge becomes dull or otherwise unacceptable, the threading insert must be replaced with a new or resharpened one.

Conventional mechanical chip breakers are ground in the form of an inclined plane, having a pointed edge adjacent the cutting edge of the threading insert, inclining increasingly with increasing distance from the cutting edge of the threading insert, and terminating in a planar face. The conventional mechanical chip breaker produces very long, razor-like, wiry chips which can damage the threading insert, the toolholder, the workpiece, or the operator. Further, these chips are difficult to collect and pose disposal handling problems. Still further, the optimum position of the conventional mechanical chip breaker with respect to the cutting edge of the threading insert is almost impossible to consistently achieve. As a result, material build-up between the mechanical chip breaker and the threading insert can be expected to occur. This build-up ultimately can cause poor part finish, premature insert failure, and even possible insert breakage.

It is ideal for the workpiece to be broken into manageable chips in the form of "C's" and "9's" which are narrower than the threads being formed. Narrowing the removed material helps to initiate chip control by bending the material away from the sides of the thread grooves, thereby concentrating the stress and strain properties of the material toward the center of the chips. Thus, the prior art chip breaker suffers from being deficient in chip management.

The ability of pressing a chip breaker form onto a positive threading insert is very difficult. When pressing into a positive die cavity, a neutral press land cannot be avoided when the green insert is ejected. A neutral press land prevents the insert from having a positive edge at the intersection of the insert's rake face. Pressing a positive insert without the appearance of a press land presents a major problem with current manufacturing techniques.

Cutting inserts for turning a workpiece are known in the art, such as for example an indexable insert disclosed in U.S. Pat. No. 5,249,894. Turning is frequently a part of the over-all machining operation associated with the fabrication of a threaded workpiece. For example, a taper may be provided on the workpiece prior to execution of the threading operation. It remains a problem in the art to devise an insert which takes into account a systems approach to machining of a workpiece when both turning and threading operations are involved.

Accordingly, what remains needed in the art is a threading and turning insert which is indexable and provided with an integral chip breaker, respectively, for each of the threading and turning insert portions thereof.

SUMMARY OF THE INVENTION

The present invention is a double cutting edge, indexable threading and turning insert having a threading insert portion and a turning insert portion. Each of the threading insert portion and the turning insert portion has, respectively, an integral pressed-in chip breaker having ideal chip management characteristics. The indexable threading and turning insert according to the present invention is polygonal, and preferably has a substantially diamond shape having a first planar face, an opposite second planar face, and first, second, third and fourth insert faces extending between the first and second planar faces, wherein the threading insert portion is contiguous a first corner formed by intersection of the first and second planar faces and the turning insert portion is contiguous a second corner formed by intersection of the third and fourth insert faces, the second corner being located opposite the first corner.

The threading insert portion is characterized as follows. The first insert face extends between a first land and the second planar face and the second insert face extends between a second land and the first planar face, wherein the first and second insert faces mutually adjoin the first corner. First and second cutting edges are located, respectively, at the first and second insert faces, wherein the first cutting edge is formed at the intersection of the first insert face and the first land and wherein the second cutting edge is formed at the intersection of the second insert face and the second land. Each of the first and second cutting edges is provided with a plurality of noses separated by gullets. The contour of the noses and gullets is predetermined to provide a predetermined thread form, such as a buttress thread form. The first and second planar faces adjacent the first and second cutting edges are respectively associated with first and second integral, pressed-in chip breakers, each in the form of a raised island, the incident face contour thereof corresponding to the nose-and-gullet contour of the respective cutting edge adjacent thereto. Preferably, the incident face contour has scalloped portions adjacent the noses.

The turning insert portion is characterized as follows. The third and fourth insert faces extend between a third land formed in the first planar face and a fourth land formed on the second planar face, wherein the second and third insert faces mutually adjoin the second corner. Third and fourth cutting edges are located, respectively, at the intersection of the third land with the third and fourth insert faces, and at the intersection of the fourth land with the third and fourth insert faces. The first and second planar faces respectively adjacent the third and fourth cutting edges are respectively associated with third and fourth integral, pressed-in chip breakers, each in the form of a raised island corresponding to the contour of the respective cutting edge adjacent thereto, and further preferably having a double-stepped, wing backed shape in registry with respect to the second corner.

The first and second cutting edges are symmetrically inverted relative to each other, and the third and fourth cutting edges are inverted relative to each other, to thereby provide indexing respectively therebetween within ANSI and ISO standards for negative utility insert tolerances.

When used for cutting threads, the indexable threading and turning insert is placed in a negative pocket of a toolholder, wherein the negative angle is preferably nine and one-half degrees. The land of the active cutting edge is positively angled at preferably nine and one-half degrees. Accordingly, the land of the active cutting edge becomes neutral in the areas that are perpendicular to the workpiece, elsewhere the active cutting edge remains slightly positive. The first and second chip breakers are provided with a long delta drop, as measured from a planar face of the insert to its respective cutting edge, and an incident angle of thirty degrees. With the indexable threading and turning insert located in the aforementioned negative pocket, the resulting incident angle is preferably thirty-nine and one-half degrees. This angle is optimum for providing excellent chip control, wherein chips are formed in manageable "C's" and "9's" and with the major stress and strain concentration being directed toward the middle of the formed chip. This chip control is further aided by the preferred scalloped portions adjacent the noses, which tends to force the chips to the center of the teeth, thereby bending the chips inward and back against the incident angle. Thus, the chips deform away from the thread walls toward the center of the first and second chip breaker's incident angle that is perpendicular to the workpiece.

When used for turning, the indexable threading and turning insert is placed in a negative pocket of a toolholder, wherein the negative angle is preferably seven degrees. Accordingly, the land of the active cutting edge becomes neutral on the areas that are perpendicular to the workpiece, elsewhere the active cutting edge remains slightly positive.

Accordingly, it is an object of the present invention to provide an indexable, two sided threading and turning insert.

It is an additional object of the present invention to provide an indexable threading and turning insert having a pressed-in chip breaker island, respectively, for each of the threading and turning insert portions thereof.

It is another object of the present invention to provide an indexable, two sided threading and turning insert having a pressed-in chip breaker island, respectively, for each cutting edge thereof.

It is a further object of the present invention to provide an indexable insert having a two cutting edge threading insert portion including a pressed-in chip breaker island for each cutting edge thereof, wherein chips produced during operation thereof are highly manageable.

It is a yet another object of the present invention to provide an indexable threading and turning insert including a two cutting edge threading insert portion having a pressed-in chip breaker island for each cutting edge thereof, wherein a positive land is provided perpendicular to the cutting edge.

It is still a further object of the present invention to provide an indexable threading and turning insert including a two cutting edge threading insert portion having a pressed-in chip breaker island for each cutting edge thereof, wherein an increased delta-drop and total maximum depth combine to provide chips during operation thereof which are highly manageable.

It is yet an additional object of the present invention to provide an indexable threading and turning insert including a two cutting edge threading insert portion having a pressed-in chip breaker island for each cutting edge thereof, and wherein chips produced during operation thereof are highly manageable due to scalloped forms provided in the chip breaker.

It is still another object of the present invention to provide an indexable threading and turning insert including a two cutting edge threading insert portion having a pressed-in chip breaker island for each cutting edge thereof, wherein each cutting edge has a positive land oriented at a predetermined angle and the chip breaker adjacent thereto has an incident angle, and wherein the pocket of the toolholder supporting the indexable threading insert has a negative angle of a magnitude equal to the predetermined angle, thereby providing selective neutrality of the land and a long incident angle of the adjacent chip breaker.

These and additional objects, features and benefits will become clear from the following description.

BRIEF DESCRIPTION OF THE DRAWING

FIG. 4 is a front elevational view of the indexable threading and turning insert, shown installed in the negative pocket of a toolholder for cutting threads in a workpiece.

FIG. 5 is a side elevational view of the indexable threading and turning insert, shown installed in the negative pocket of a toolholder for cutting threads in a workpiece.

FIG. 6 is a bottom plan view of the indexable threading and turning insert according to the present invention.

FIG. 7 is a top plan view of the indexable threading and turning insert according to the present invention.

DETAILED DESCRIPTION OF THE PREFERRED EMBODIMENTS

Figure 1:
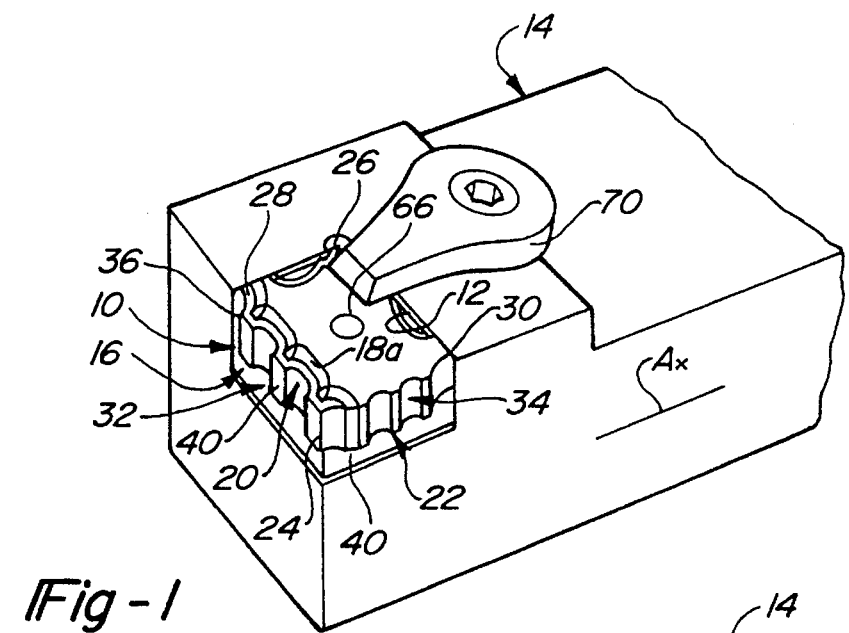
FIG. 1 is a perspective view of the indexable threading and turning insert according to the present invention, shown installed in the negative pocket of a toolholder for cutting threads in a workpiece.

Referring now to the Drawing, FIG. 1 generally depicts the indexable threading and turning insert 10 according to the present invention, wherein it is shown in operation received in a pocket 12 formed at a forward end of a toolholder 14 with an orientation which provides threads in a workpiece. The indexable threading and turning insert 10 is composed of an insert body 16 having a general diamond shape, wherein a first corner 24 and a second corner 26 are acute and wherein a third corner 28 and a fourth corner 30 are obtuse. The indexable threading and turning insert 10 of the preferred embodiment includes a threading insert portion 10a contiguous the first corner 24 and a turning insert portion 10b contiguous the second corner 26.

The threading insert portion 10a of the indexable threading and turning insert 10 will now be described.

Adjoining the first corner 24 is a first insert face 32 and a second insert face 34. A first cutting edge 20 is formed by the intersection of the first insert face 32 and a first land 36 formed in a first side 16a of the insert body 16. A second cutting edge 22 is formed by the intersection of the second insert face 34 and a second land 38 formed in a second side 16b of the insert body 16, wherein the second side 16b is located opposite the first side 16a. Integral, pressed-in first and second chip breakers 18a, 18b are further located, respectively, at the opposing first and second sides 16a, 16b of the insert body 16. The first and second chip breakers 18a, 18b, are located, respectively, adjacent the first and second cutting edges 20, 22 in predetermined proximity thereto and are each provided with a predetermined contour corresponding to the contour of the respective first and second cutting edges to thereby provide optimum chip management as a respective one of the first and second cutting edges serves as an active cutting edge for engaging a workpiece. The threading insert portion 10a is inversely symmetric about a diagonal between the first and second corners 24, 26. Accordingly, when the active cutting edge, first cutting edge 20 in FIG. 1, becomes dull or otherwise unacceptable, the indexable threading and turning insert 10 is removed from the pocket 12, indexed and then replaced so that now the second cutting edge 22 is the active cutting edge for engaging a workpiece.

Each of the first and second cutting edges 20, 22 is identically provided with a predetermined contour for performing a preselected thread cutting job on a workpiece. The threading insert portion 10a shown in the Drawing is directed to providing buttress thread forms in a workpiece. In this regard, the first and second cutting edges 20, 22 have a plurality of noses 40, separated by gullets 42, on either side thereof, respectively.

As shown in FIG. 6, the preferred embodiment of the first and second cutting edges 20, 22 are provided with three noses 40, wherein the shape of the noses and the respective gullet 42 on either side thereof provide buttress thread forms on a workpiece. Thus, each nose 40 is provided with a respective flat nose edge 44a, 44b, 44c for forming a flat thread root in the workpiece, a forward thread side forming edge 46 in perpendicular relation to the nose edge, and a rear thread side forming edge 48 at an acute angle with respect to the nose edge. A first nose edge 44a adjacent the first corner 24 performs an initial pass with respect to the workpiece, and projects to a first preselected location. A second nose edge 44b adjacent the first nose edge 44a performs a deeper pass with respect to the workpiece and projects a distance $d_1$ further than the first nose edge 44a. A third nose edge 44c adjacent the second nose edge 44b performs a final pass with respect to the workpiece and projects a distance $d_2$ further than the second nose edge 44b. It will be noted that the first and second insert faces 32, 34 follow the contour of the first and second cutting edges 20, 22, respectively.

While the first and second cutting edges are contoured for forming buttress thread machining of a workpiece are shown by way of preferred example, it is clear that other thread forms, such as unified, sharp-vee, square, acme, and knuckle thread forms, may be provided in a workpiece by selection of a suitable contour of the first and second cutting edges.

Figure 2:
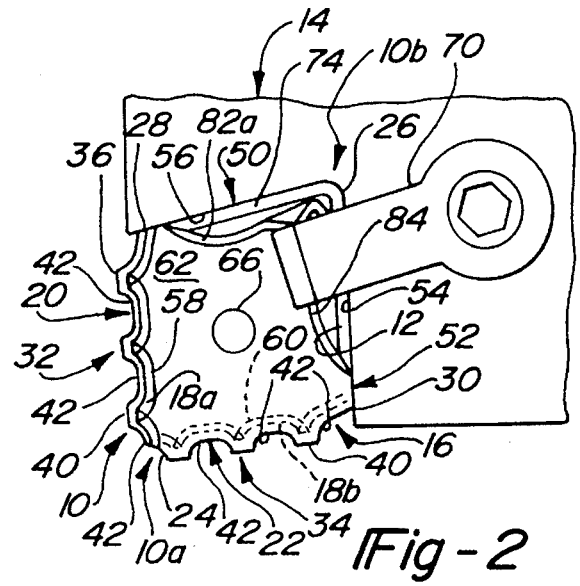
FIG. 2 is a top plan view of the indexable threading and turning insert, shown installed in the negative pocket of a toolholder for cutting threads in a workpiece.

A third insert face 50 and a fourth insert face 52 each adjoin the second corner 26. The third and fourth insert faces 50, 52 abut first and second pocket sidewalls 54, 56 of the toolholder 14, as shown in FIG. 2 to thereby locate the threading insert portion 10a with respect to the pocket 12.

Figure 8:
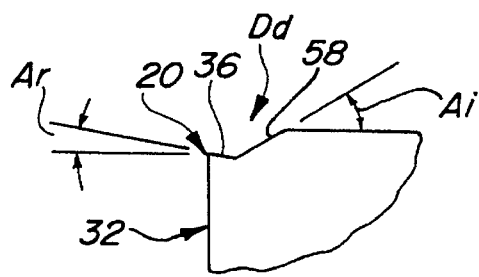
FIG. 8 is a sectional side view of the indexable threading and turning insert seen along line 8—8 in FIG. 7, showing a cutting edge and the double-stepped chip breaker island thereof.

The first and second chip breakers 18a, 18b are each recessed from their respective first and second cutting edge 20, 22 and are each contoured to correspond to the aforementioned noses 40 and gullets 42 thereof. The recess of each of the first and second chip breakers 18a, 18b from their respective first and second cutting edge 20, 22 is defined by the first and second lands 36, 38, respectively, as best seen in FIGS. 7 and 8. The first and second lands 36, 38 have a positive rake angle $A_r$ of preferably nine and one-half degrees with respect to a plane parallel to first and second planar faces 62, 64, respectively, of the indexable threading and turning insert 10, as best shown in FIG. 8.

The first chip breaker 18a is characterized by a first incident face 58 adjoining the first planar face 62. The second chip breaker 18b is characterized by a second incident face 60 adjoining the second planar face 64. Each of the first and second planar faces 62, 64 are mutually parallel and are generally perpendicular to the first and second insert faces 32, 34. Each of the first and second incident faces 58, 60 has an incident angle $A_i$ of preferably thirty degrees with respect to its respective adjoining first and second planar face 62, 64. The combination of the first and second lands 36, 38 with its respective first and second incident face 58, 60 provides a delta drop $D_d$ adjacent each of the first and second cutting edges 20, 22.

As indicated by FIGS. 1 through 10, it is preferred for the first and second incident faces 58, 60 to be provided with a scalloped contour 72 adjacent each of the noses 40 and facing theretoward. Accordingly, the width of the first and second lands 36, 38 as measured from the respective cutting edge 20, 22, varies and the incident angle $A_i$ does not follow the respective cutting edge at the same distance. In this regard, the first and second incident faces 58, 60 are closer the radiuses of the noses 40 of the respective cutting edge 20, 22. This configuration tends to force chips into the center of the nose which increases chip control by bending the chips inward and back against the incident angle $A_i$, thereby providing optimum chip control for each roughing pass. Accordingly, this structural feature improves chip control on a broad range of workpiece materials, which would otherwise be difficult to machine.

Figure 11:
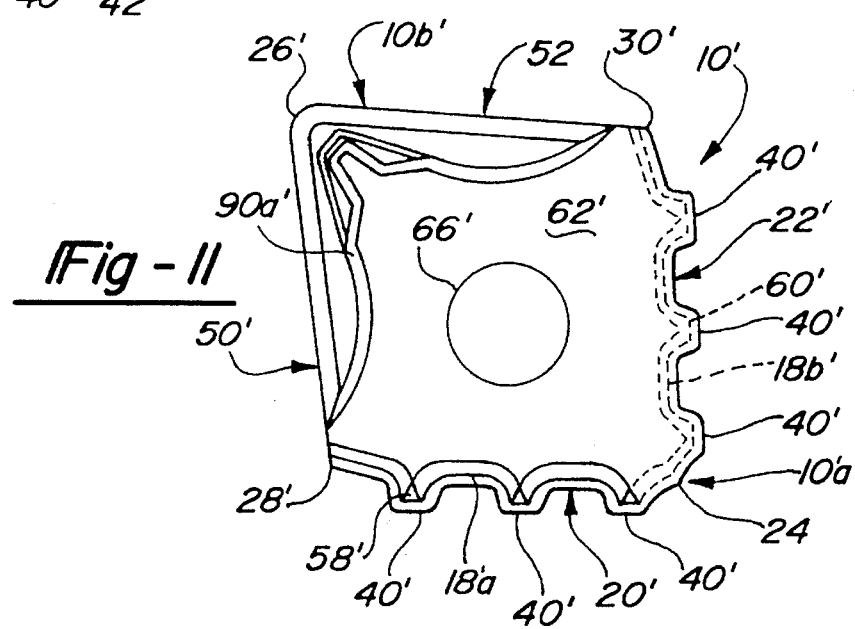
FIG. 11 is a top plan view of an indexable threading and turning insert similar to that depicted in FIG. 7, wherein the incident face contour of the raised island chip breaker associated with the threading insert portion is not scalloped.

Other contours may be provided in the first and second incident faces adjacent the noses. For example, FIG. 11 depicts an indexable threading and turning insert 10' wherein a straight contour is provided in the incident faces 58', 60' adjacent the noses 40'. In this case, the position of the incident faces 58', 60' is constant with respect to the noses 40' of the respective cutting edge 20', 22'. In FIG. 11, like functioning parts of the indexable threading and turning insert 10' with respect to the indexable threading and turning insert 10 are designated by like numbers with primes.

It will be noted from the foregoing description and the accompanying Drawing, that the first insert face 32 extends between the first land 36 and the second planar face 64, while the second insert face 34 extends between the second land 38 and the first planar face 62.

The pocket 12 in the toolholder 14 is negative with respect to the toolholder, wherein the pocket has a negative pocket angle $A_p$ relative to the axis $A_x$ of the toolholder 14. The pocket angle $A_p$ has the same magnitude as the rake angle $A_r$. Accordingly, when the threading insert 10 is placed into the pocket 12, one of the first and second planar faces 62, 64 abuts the floor 12a of the pocket (or a spacer 68 located therebetween), and the portion of the land of the active cutting edge having an angle in parallel alignment with the angle of the pocket (that is, in alignment with the toolholder axis $A_x$) then becomes neutral while all other portions of the land remain positive; and the magnitude of the incident angle $A_i$ is increased by the incident angle to an effective incident angle of thirty nine and one-half degrees for that portion of the incident angle that is in parallel alignment with the pocket angle.

A center bore 66 is provided in the indexable threading and turning insert 10, passing through each of the first and second planar faces 62, 64. The center bore 66 affords standard ANSI and ISO indexing, wherein an affixment bolt (not shown) is placed therein and threaded into a threaded affixment passage in the floor 12a of the pocket 12 in a conventional manner.

Figure 3:
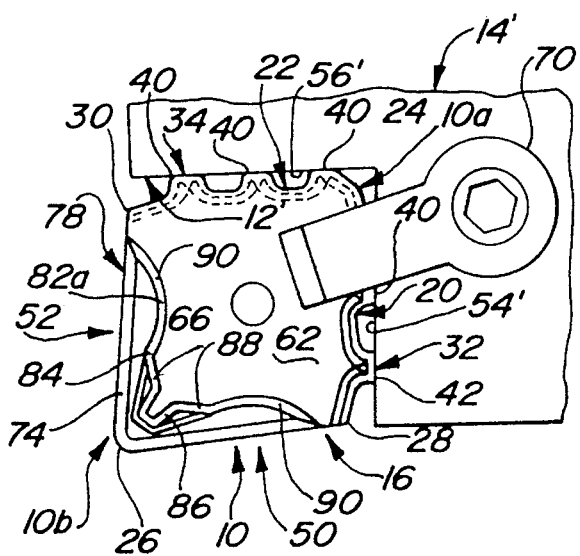
FIG. 3 is a top plan view of the indexable threading and turning insert, shown installed in a negative pocket of a toolholder for turning a workpiece.

As best shown in FIGS. 3 and 4, a spacer 68 is optionally provided between the floor 12a and the planar face facing theretoward to elevationally locate the opposite planar face so that a toolholder clamp 70 clampably abuts thereto, thereby affixing the threading insert within in the pocket 12 (in absence of an affixment bolt).

The turning insert portion 10b of the indexable threading and turning insert 10 will now be detailed.

The third and fourth insert faces 50, 52 extend between a third land 74 formed at the first side 16a and a fourth land 76 formed at the second side 16b, wherein as indicated hereinabove, the third and fourth insert faces mutually adjoin the second corner 26. Third and fourth cutting edges 78, 80 are located, respectively, at the intersection of the third land 74 with the third and fourth insert faces 50, 52, and at the intersection of the fourth land 76 with the third and fourth insert faces.

Each of the first and second planar faces 62, 64 adjacent the third and fourth cutting edges 78, 80 contiguously adjoins a respective third and fourth integral, pressed-in chip breaker 82a, 82b. Each of the third and fourth chip breakers 82a, 82b is in the form of a raised island having a respective third and fourth incident face 84a, 84b of a predetermined contour adjacent the respective third and fourth cutting edges 78, 80. Preferably, the predetermined contour is a double-stepped, wing-back shape in registry with respect to the second corner 26.

Figure 9:
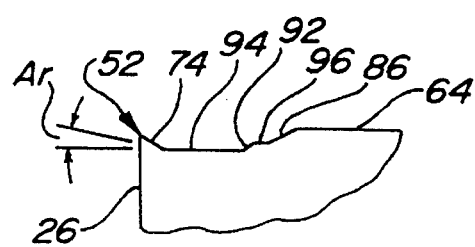
FIG. 9 is a sectional side view of the indexable threading and turning insert seen along line 9—9 in FIG. 7, showing a cutting edge, the positive land and the delta drop of the chip breaker island thereof.

As can be best discerned from FIGS. 7 and 9, the third and fourth incident faces 84a, 84b is spaced from the third and fourth lands 74, 76, respectively. The third and fourth incident faces 84a, 84b are each characterized by a substantially rectilinear portion 86 adjacent the second corner 26, an obtusely angled linear portion 88 contiguous either side of the rectilinear portion, and a curvilinear portion 90 contiguous each of the linear portions, wherein the aforesaid rectilinear, linear and curvilinear portions collectively form the aforementioned wing-back shape of the third and fourth incident faces 84a, 84b. Spaced from the rectilinear portion 86 and the linear portion 88, a leading segment 92 of the curvilinear portion 90 has an obtuse U-shape spaced from and in register with the rectilinear portion 86. A first neutral face 94 is formed respectively between the third and fourth lands 74, 76 and the curvilinear portion 90, inclusive of the leading segment 92 thereof. A second neutral face 96 is formed between the leading segment 92 and the respective rectilinear and linear portions 86, 88.

The third and fourth cutting edges 78, 80, in combination with the third and fourth chip breakers 82a, 82b, provide optimum performance for turning operations on a workpiece. Further, the double-step, wing-backed shape of the third and fourth incident faces 84a, 84b provide full range workpiece chip control in both fight and heavy depths of cuts.

To perform turning operations on a workpiece, the threading and turning insert 10 is placed in a pocket 12' of a toolholder 14', wherein the noses 40 abut the sidewalls 54', 56' of the pocket and the turning insert portion 10b faces outwardly from the pocket. The pocket 12' is negative and set at an angle equal to the rake angle $A_r'$ of the third and fourth lands 74, 76, respectively, which is for example, preferably about seven degrees. Accordingly, the third and fourth lands 74, 76 opposite the workpiece are neutral, resulting in the indexable threading and turning insert 10 having a maximum strength at the third and fourth cutting edges 78, 80. At the same time, the variable secondary angle of the third and fourth incident faces 84a, 84b around the radius at the corner 26 provides excellent chip control at lower depths of cuts, such as those encountered when cutting a taper on a workpiece. Other configurations of the third and fourth chip breakers for respective use with the third and fourth cutting edges 78, 80 may be used in place of the configuration depicted in the Drawing of the third and fourth incident faces 84a, 84b, such as for example that disclosed in U.S. Pat. No. 5,249,894.

The first and second cutting edges are symmetrically inverted relative to each other, and the third and fourth cutting edges are inverted relative to each other, to thereby provide indexing respectively therebetween within ANSI and ISO standards for negative utility insert tolerances.

The indexable threading and turning insert 10 is fabricated by being pressed-in on both sides via a die, wherein the insert body 16, the first and second chip breakers 18a, 18b, and the third and fourth chip breakers 82a, 82b are integrally formed. The pressing is precise to within 0.0015 inch for all critical mean dimensions, and each of the pressed-in chip breakers are precisely placed with respect to their respective cutting edge.

In operation, the indexable threading and turning insert 10 is placed in a pocket 12 of a toolholder 14, wherein one of the first and second cutting edges is an active cutting edge in that it projects from a forward end of the toolholder and wherein the third and fourth insert faces about the sidewalls of the pocket. The indexable threading and turning insert is affixed with respect to the pocket via an affixment bolt or a toolholder clamp. The negative pocket angle $A_p$ of the pocket of the toolholder is equal in magnitude with the positive rake angle $A_r$ of the land, thereby providing proper clearance under the active cutting edge.

During engagement with a workpiece, the active cutting edge, at the nose and gullet components thereof, will cause the workpiece to be worked. The chips thereby produced will travel along the land adjoining the active cutting edge and then encounter the incident face of the adjacent first or second chip breaker as the case may be. The precisely configured delta-drop $D_d$ created by the neutral land and the tall angle $(A_i+A_p)$ of the incident face, together with the scalloped incident face at each of the noses of the active cutting edge, causes the worked material of the workpiece to curl into manageable chips ("C's" and "9's"). In this regard, the stress and strain concentration of the chips is directed toward the middle thereof, which effect requires, and is satisfied by, the depth provided by the delta drop $D_d$ (see FIG. 8).

The effective incident angle $(A_i+A_p)$ is critical: too much angle will cause over crowding of the chips, resulting in a loss of chip breaker performance; too little angle will cause loss of chip control. An optimum effective incident angle is between thirty-eight and forty-one degrees with respect to the toolholder axis. Accordingly, the effective incident angle of the incident face of the chip breaker when situated in the negative pocket of the toolholder is thirty-nine and one-half degrees, which is optimal for providing chip control.

Further, the active cutting edge has added strength in that the positive rake of the land adjoining thereto is neutral along all areas perpendicular to the workpiece, when placed in the negative pocket of the toolholder. Around all corner radiuses, as well as along the surfaces not perpendicular to the workpiece, the cutting edge remains slightly positive. This feature helps reduce force distributions in these critical areas of the thread form, as well as allowing the chips to deform away from the thread sides and more toward the center of the incident angle of the chip breaker that is perpendicular to the workpiece.

When the first or second cutting edge which is serving as the active cutting edge becomes dull or otherwise unacceptable, the threading and turning insert is removed from the pocket, indexed, and then reinserted into the pocket, wherein the other of the first and second cutting edges is now the active cutting edge.

Further in operation, the threading and turning insert 10 is placed in a pocket 12' of a toolholder 14', wherein one of the third and fourth cutting edges is an active cutting edge in that it projects from a forward end of the toolholder and wherein the noses of the first and second insert faces abut the sidewalls of the pocket. As mentioned hereinabove, a spacer may be provided in the pocket 12' located between the floor of the pocket and the planar face theretoward. The threading and turning insert is affixed with respect to the pocket via an affixment bolt or a toolholder clamp. The negative pocket angle of the pocket of the toolholder is equal in magnitude with the positive rake angle of the land, thereby providing proper clearance under the active cutting edge.

During engagement with a workpiece, the active cutting edge will cause the workpiece to be worked, such as for example providing a taper thereto. The chips thereby produced will travel along the land adjoining the active cutting edge and then encounter the incident face of the adjacent third or fourth chip breaker as the case may be. The double-step, wing backed shape of the first or second chip breaker provides chip management in both light and heavy cuts.

When the third or fourth cutting edge which is serving as the active cutting edge becomes dull or otherwise unacceptable, the indexable threading and turning insert is removed from the pocket, indexed, and then reinserted into the pocket, wherein the other of the third and fourth cutting edges is now the active cutting edge.

In regard to indexing, the indexable threading and turning insert 10 may be placed in a toolholder pocket in an orientation selected for either threading or turning operations. For example, the threading and turning insert may be used and indexed once for threading operations, then used and indexed once for turning operations, or vice versa.

Figure 10:
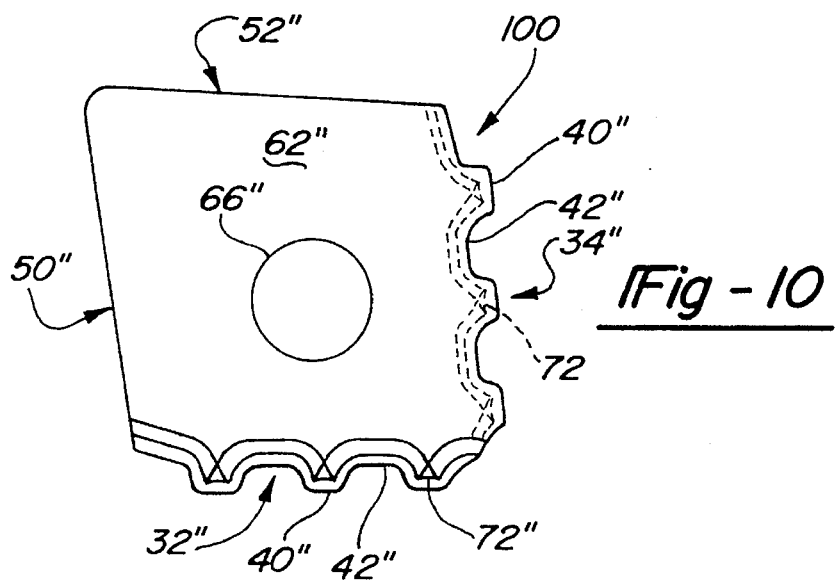
FIG. 10 is a top plan view of an indexable threading insert similar to that depicted in FIG. 7, but without a turning insert portion.

FIG. 10 depicts an alternative embodiment for a threading insert 100, wherein a turning insert portion is absent. In this regard, parts thereof which function like the parts described with respect to the indexable threading and turning insert 10 are designated by like numerals with double primes.

By way of preferred example, the indexable threading and turning insert may be structured for providing 5 threads per inch and a ¾ taper per foot, with a D.O.C. equal to 3 rough passes to 90 percent of thread depth, and with an S.F.M. equal to 360 feet per minute.

It will be understood that by providing a threading insert portion and a turning insert portion integrally with respect to a single insert, that great economy and utility is provided, while at the same time making a systems approach to machining threaded parts a practical reality.

To those skilled in the art to which this invention appertains, the above described preferred embodiment may be subject to change or modification. Such change or modification can be carried out without departing from the scope of the invention, which is intended to be limited by the scope of the appended claims.

What is claimed is:

1. An indexable threading and turning insert for selectively providing threading and turning of a workpiece, comprising:

an insert body having a first side and an opposite second side, said insert body having a first corner and an opposite second corner, said insert body having a first insert face and a second insert face mutually adjoining said first corner, and a third insert face and a fourth insert face mutually adjoining said second corner;

a first cutting edge formed at an intersection of said first insert face and said first insert side;

a second cutting edge formed at an intersection of said second insert face and said second insert side;

a third cutting edge formed at an intersection of said third insert face and said first side;

a fourth cutting edge formed at an intersection of said fourth insert face and said second side; and wherein said first cutting edge and said first insert face provide a contour for providing a first thread form on a workpiece, said second cutting edge and said second insert face provide a contour for providing a second thread form on a workpiece, and said third cutting edge and said fourth cutting edge provide a turning edge for material removal on a workpiece.

2. The indexable threading and turning insert of claim 1, further comprising:

first chip breaker means integrally connected with said first side for providing workpiece chip control adjacent said first cutting edge;

second chip breaker means integrally connected with said second side for providing workpiece chip control adjacent said second cutting edge;

third chip breaker means integrally connected with said first side for providing workpiece chip control adjacent said third cutting edge; and fourth chip breaker means integrally connected with said second side for providing workpiece chip control adjacent said fourth cutting edge.

3. An indexable threading insert with pressed-in chip breakers for providing thread forms on a workpiece, comprising:

an insert body having a first side and an opposite second side, said insert body further having a first corner, a second corner opposite said first corner, a third corner and a fourth corner opposite said third corner, said insert body having a first insert face and a second insert face which mutually adjoin said first corner, said insert body having a third insert face and a fourth insert face which mutually adjoin said second corner, a first cutting edge being formed at an intersection of said first insert face and said first side, a second cutting edge being formed at an intersection of said second insert face and said second side, said first cutting edge and said first face being provided with a predetermined contour for providing a predetermined thread form on a workpiece, said second cutting edge and said second insert face having said predetermined contour;

a first chip breaker integrally connected with said first side of said insert body, said first chip breaker comprising a first raised island comprising:
- a first incident face having said predetermined contour, said first incident face being recessed a predetermined distance from said first cutting edge; and
- a first planar face contiguously adjoining said first incident face, said first incident face being oriented at a predetermined incident angle with respect to said first planar face; and a second chip breaker integrally connected with said second side of said insert body, said second chip breaker comprising a second raised island comprising:
- a second incident face having said predetermined contour, said second incident face being recessed said predetermined distance from said second cutting edge; and
- a second planar face contiguously adjoining said second incident face, said second incident face being oriented with respect to said second planar face at said predetermined incident angle, said first planar face being parallel with respect to said second planar face;

wherein said insert body, said first chip breaker and said second chip breaker are collectively inversely symmetrical with respect to a diagonal between said first and second corners;

wherein said predetermined contour of said first and second cutting edges and said first and second insert faces comprises a plurality of noses, each nose of said plurality of noses being separated from each other by a gullet; and wherein said predetermined contour on said first and second incident faces comprises a scalloped portion respectively adjacent to and facing toward each said nose of said plurality of noses.

4. An indexable threading and turning insert with pressed-in chip breakers for selectively providing threading and turning of a workpiece, comprising:

an insert body having a first side and an opposite second side, said insert body further having a first corner, a second corner opposite said first corner, a third corner and a fourth corner opposite said third corner, said insert body having a first insert face and a second insert face which mutually adjoin said first corner, said insert body having a third insert face and a fourth insert face which mutually adjoin said second corner, a first cutting edge being formed at an intersection of said first insert face and said first side, a second cutting edge being formed at an intersection of said second insert face and said second side, said first cutting edge and said first face being provided with a first predetermined contour for providing a predetermined thread form on a workpiece, said second cutting edge and said second insert face having said first predetermined contour, a third cutting edge being formed at an intersection of said third insert face and said first side, and a fourth cutting edge being formed at an intersection of said fourth insert face and said second side;

first chip breaker means integrally connected with said first side of said insert body for providing workpiece chip control adjacent said first cutting edge;

second chip breaker means integrally connected with said second side of said insert body for providing workpiece chip control adjacent said second cutting edge;

third chip breaker means integrally connected with said first side of said insert body for providing workpiece chip control adjacent said third cutting edge; and fourth chip breaker means integrally connected with said second side of said insert body for providing workpiece chip control adjacent said fourth cutting edge;

wherein said first corner, said first face, said first cutting edge, said second face, said second cutting edge, said first chip breaker means and said second chip breaker means collectively comprise a threading insert portion for providing a thread form on a workpiece; and wherein said third corner, said third cutting edge, said fourth face, said fourth cutting edge, said third chip breaker means and said fourth chip breaker means collectively comprise a turning insert portion for providing turning of a workpiece.

5. The indexable threading and turning insert of claim 4, wherein said first and second chip breaker means comprise:

a first chip breaker comprising:
- a first incident face having said predetermined contour, said first incident face being recessed a predetermined distance from said first cutting edge; and
- a first planar face contiguously adjoining said first incident face, said first incident face being oriented at a predetermined incident angle with respect to said first planar face; and a second chip breaker comprising:
- a second incident face having said predetermined contour, said second incident face being recessed said predetermined distance from said second cutting edge; and
- a second planar face contiguously adjoining said second incident face, said second incident face being oriented with respect to said second planar face at said predetermined incident angle, said first planar face being parallel with respect to said second planar face.

6. The indexable threading and turning insert of claim 5, wherein said first side between said first cutting edge and said first incident face forms a first land, said first land being positively angled with respect to a plane parallel with said first planar face at an angle of substantially nine and one-half degrees; and wherein said second side between said second cutting edge and said second incident face forms a second land, said second land being positively angled with respect to a plane parallel with said second planar face at an angle of substantially nine and one-half degrees.

7. The indexable threading and turning insert of claim 6, wherein said first planar surface is generally perpendicular to said first insert face; wherein said second planar face is generally perpendicular to said second insert face; and wherein said predetermined incident angle is substantially thirty degrees.

8. The indexable threading and turning insert of claim 7, wherein said predetermined contour of said first and second cutting edges and said first and second insert faces comprises a plurality of noses, each nose of said plurality of noses being separated from each other by a gullet.

9. The indexable threading and turning insert of claim 8, wherein said first predetermined contour comprises a scalloped portion respectively adjacent to and facing toward each said nose of said plurality of noses.

10. The indexable threading and turning insert of claim 9, wherein said predetermined contour provides buttress form threads on a workpiece.

11. The indexable threading and turning insert of claim 9, wherein said third and fourth chip breaker means comprise:
    a third chip breaker comprising a third incident face recessed from said third cutting edge, said third incident face contiguously adjoining said first planar face, said third incident face having a second predetermined configuration; and
    a fourth chip breaker comprising a fourth incident face recessed from said fourth cutting edge, said fourth incident face contiguously adjoining said second planar face, said fourth incident face having said second predetermined configuration.

12. The indexable threading and turning insert of claim 11, wherein said first side between said third cutting edge and said third incident face forms a third land, said third land being positively angled with respect to a plane parallel with said first planar face at an angle of substantially seven degrees; and wherein said second side between said fourth cutting edge and said fourth incident face forms a fourth land, said fourth land being positively angled with respect to a plane parallel with said second planar face at an angle of substantially seven degrees.

13. The indexable threading and turning insert of claim 12, wherein said second predetermined contour comprises substantially a double-stepped, wing-back shape in registry with said second corner.

14. The indexable threading and turning insert of claim 13, wherein said second predetermined contour comprises:
    a rectilinear portion adjacent said second corner, said rectilinear portion having first and second ends facing away from said second corner;
    first and second linear portions respectively contiguous each of said first and second ends of said rectilinear portion; and
    first and second curvilinear portions respectively contiguous each linear portion;
    wherein said rectilinear portion, said first and second linear portions, and said first and second curvilinear portions collectively define said wing-back shape.

15. The indexable threading and turning insert of claim 14, wherein said second predetermined contour further comprises a substantially U-shaped leading segment of said first and second curvilinear portions spaced from said rectilinear portion and said first and second linear portions, said U-shaped leading segment being in registry with said rectilinear portion; a first neutral face being formed between respective said third and fourth lands and said first and second curvilinear portions; a second neutral face being formed between said U-shaped leading segment and said rectilinear portion and said first and second linear portions.

16. The indexable threading and turning insert of claim 15, wherein said insert body is diamond shaped, wherein said first and second corners are acute and said third and fourth corners are obtuse.

17. An indexable threading and turning insert with pressed-in chip breakers and a toolholder therefor for selectively providing threading and turning of a workpiece, comprising:
    a toolholder having a toolholder axis, said toolholder having a forward end, said forward end having a pocket formed therein, said pocket being negatively angled with respect to said toolholder axis at a predetermined pocket angle;
    an indexable threading and turning insert with pressed-in chip breakers receivable in said pocket, comprising:
        an insert body having a first side and an opposite second side, said insert body further having a first corner, a second corner opposite said first corner, a third corner and a fourth corner opposite said third corner, said insert body having a first insert face and a second insert face which mutually adjoin said first corner, said insert body having a third insert face and a fourth insert face which mutually adjoin said second corner, a first cutting edge being formed at an intersection of said first insert face and said first side, a second cutting edge being formed at an intersection of said second insert face and said second side, said first cutting edge and said first face being provided with a first predetermined contour for providing a predetermined thread form on a workpiece, said second cutting edge and said second insert face having said first predetermined contour, a third cutting edge being formed at an intersection of said third insert face and said first side, and a fourth cutting edge being formed at an intersection of said fourth insert face and said second side;
    first chip breaker means integrally connected with said first side of said insert body for providing workpiece chip control adjacent said first cutting edge;
    second chip breaker means integrally connected with said second side of said insert body for providing workpiece chip control adjacent said second cutting edge;
    third chip breaker means integrally connected with said first side of said insert body for providing workpiece chip control adjacent said third cutting edge; and
    fourth chip breaker means integrally connected with said second side of said insert body for providing workpiece chip control adjacent said fourth cutting edge;
    wherein said first corner, said first face, said first cutting edge, said second face, said second cutting edge, said first chip breaker means and said second chip breaker means collectively comprise a threading insert portion for providing a thread form on a workpiece; and wherein said third corner, said third cutting edge, said fourth face, said fourth cutting edge, said third chip breaker means and said fourth chip breaker means collectively comprise a turning insert portion for providing turning of a workpiece; and
    means for releasably affixing said indexable threading and turning insert within said pocket so that one of said first, second, third and fourth cutting edges projects therefrom to thereby provide an active cutting edge.

18. The indexable threading and turning insert and toolholder therefor of claim 17, wherein said first and second chip breaker means comprise:
    a first chip breaker comprising:
        a first incident face having said predetermined contour, said first incident face being recessed a predetermined distance from said first cutting edge; and
        a first planar face contiguously adjoining said frost incident face, said first incident face being oriented at a predetermined incident angle with respect to said first planar face; and a second chip breaker comprising:
- a second incident face having said predetermined contour, said second incident face being recessed said predetermined distance from said second cutting edge; and
- a second planar face contiguously adjoining said second incident face, said second incident face being oriented with respect to said second planar face at said predetermined incident angle, said first planar face being parallel with respect to said second planar face;

wherein said first side between said first cutting edge and said first incident face forms a first land, said first land being positively angled with respect to a plane parallel to said first planar face at a first predetermined rake angle; and wherein said second side between said second cutting edge and said second incident face forms a second land, said second land being positively angled with respect to a plane parallel to said second planar face at said first predetermined rake angle; and wherein said pocket angle of said pocket positions a portion of the land of the active cutting edge that is angled in parallel alignment with respect to the pocket angle at a neutral angle with respect to the tool axis; and wherein said pocket angle of said pocket positions a portion of the incident face of the active cutting edge that is in parallel alignment with the negative angle of the pocket at an effective angle of incidence with respect to the toolholder axis equal to the stun of said predetermined pocket angle and said predetermined incident angle.

19. The indexable threading and turning insert and toolholder therefor of claim 18, wherein said first planar surface is generally perpendicular to said first insert face; wherein said second planar face is generally perpendicular to said second insert face; wherein said predetermined pocket angle is substantially nine and one-half degrees; wherein said predetermined rake angle is substantially nine and one-half degrees; and wherein said predetermined incident angle is substantially thirty degrees.

20. The indexable threading and turning insert and toolholder therefor of claim 19, wherein said predetermined contour of said first and second cutting edges and said first and second insert faces comprises a plurality of noses, each nose of said plurality of noses being separated from each other by a gullet; and wherein said first predetermined contour comprises a scalloped portion respectively adjacent to and facing toward each said nose of said plurality of noses.

21. The indexable threading and turning insert and toolholder therefor of claim 17, wherein said third and fourth chip breaker means comprise:
- a third chip breaker comprising a third incident face recessed from said third cutting edge, said third incident face contiguously adjoining said first planar face, said third incident face having a second predetermined configuration; and
- a fourth chip breaker comprising a fourth incident face recessed from said fourth cutting edge, said fourth incident face contiguously adjoining said second planar face, said fourth incident face having said second predetermined configuration;

wherein said first side between said third cutting edge and said third incident face forms a third land, said third land being positively angled with respect to a plane parallel with said first planar face at an angle of substantially seven degrees; wherein said second side between said fourth cutting edge and said fourth incident face forms a fourth land, said fourth land being positively angled with respect to a plane parallel with said second planar face at an angle of substantially seven degrees; and wherein said predetermined pocket angle is substantially seven degrees, wherein said pocket positions a portion of the land of the active cutting edge that is angled in parallel alignment with respect to the pocket angle at a neutral angle with respect to the tool axis.

22. The indexable threading and turning insert and toolholder therefor of claim 21, wherein said first planar surface is generally perpendicular to said first insert face;

wherein said second planar face is generally perpendicular to said second insert face.

* * * * *